(12) United States Patent
Hölzl et al.

(10) Patent No.: US 9,074,032 B2
(45) Date of Patent: Jul. 7, 2015

(54) MEMBRANES BASED ON POLYVINYL ALCOHOL

(75) Inventors: Manfred Hölzl, Burghausen (DE); Martin Bortenschlager, Bergkirchen (DE); Susanne Hecher, Wolfratshausen (DE); Felicitas Schauer, Aying (DE)

(73) Assignee: Wacker Chemie AG, Munich (DE)

( * ) Notice: Subject to any disclaimer, the term of this patent is extended or adjusted under 35 U.S.C. 154(b) by 925 days.

(21) Appl. No.: 13/262,170

(22) PCT Filed: Mar. 23, 2010

(86) PCT No.: PCT/EP2010/053756
§ 371 (c)(1),
(2), (4) Date: Oct. 31, 2011

(87) PCT Pub. No.: WO2010/112372
PCT Pub. Date: Oct. 7, 2010

(65) Prior Publication Data
US 2012/0031843 A1    Feb. 9, 2012

(30) Foreign Application Priority Data
Apr. 2, 2009  (DE) .................. 10 2009 002 130

(51) Int. Cl.
| | | |
|---|---|---|
| B01D 61/00 | (2006.01) | |
| B01D 39/00 | (2006.01) | |
| B01D 39/14 | (2006.01) | |
| D01D 5/06 | (2006.01) | |
| D01D 5/24 | (2006.01) | |
| D01F 6/14 | (2006.01) | |
| C08F 216/08 | (2006.01) | |
| B01D 61/36 | (2006.01) | |
| B01D 67/00 | (2006.01) | |
| B01D 71/38 | (2006.01) | |
| B01D 71/70 | (2006.01) | |
| C08F 230/08 | (2006.01) | |

(52) U.S. Cl.
CPC ............ *C08F 216/08* (2013.01); *B01D 61/362* (2013.01); *B01D 67/0006* (2013.01); *B01D 71/38* (2013.01); *B01D 71/70* (2013.01); *B01D 2323/30* (2013.01); *C08F 230/08* (2013.01)

(58) Field of Classification Search
CPC ............. B01D 2323/30; B01D 61/362; B01D 67/0006; B01D 69/142; B01D 3/00; B01D 68/08; B01D 61/00; B01D 71/70; B01D 69/06
USPC .................. 210/500.27, 500.35, 500.42, 490, 210/500.23; 264/176.1, 177.14, 178 R, 180, 264/185, 209.6; 427/387
See application file for complete search history.

(56) References Cited

U.S. PATENT DOCUMENTS

| | | | |
|---|---|---|---|
| 4,755,299 | A | 7/1988 | Bruschke |
| 5,789,081 | A | 8/1998 | Komatsu et al. |
| 6,853,469 | B1 * | 2/2005 | Tresser .................. 358/3.06 |
| 2003/0044611 | A1 | 3/2003 | Stark |
| 2006/0074187 | A1 | 4/2006 | Stark |
| 2006/0199020 | A1 | 9/2006 | Stark |
| 2006/0204703 | A1 | 9/2006 | Bacher et al. |
| 2009/0075141 | A1 * | 3/2009 | Gronwald et al. .............. 429/30 |
| 2009/0203829 | A1 | 8/2009 | Stark |
| 2010/0323573 | A1 | 12/2010 | Chu et al. |
| 2012/0031843 | A1 * | 2/2012 | Holzl et al. .................... 210/650 |

FOREIGN PATENT DOCUMENTS

| | | |
|---|---|---|
| CN | 1141233 A | 1/1997 |
| CN | 1771367 A | 5/2006 |
| DE | 10140131 A1 | 4/2003 |
| DE | 102004026609 A1 | 1/2006 |
| EP | 96339 A2 | 12/1983 |
| EP | 423949 A2 | 4/1991 |
| GB | 1325227 A | 8/1973 |
| JP | 59179605 A2 | 10/1984 |
| JP | 3030820 A | 2/1991 |
| JP | 10001515 A2 | 1/1998 |
| JP | 2008515668 T2 | 5/2008 |
| WO | 2004065437 A1 | 8/2004 |
| WO | 2005021604 A1 | 3/2005 |

OTHER PUBLICATIONS

Li, Hui-qin, et al., "Preparation and Characterization of Polyvinyl Alcohol Membranes," Journal of Tianjin Polytechnic University, No. 3, vol. 25, pp. 1-4, Jun. 2006.
Chuang W.-Y. et al., "The effect of polymeric additives on the structure and permeability of poly(vinyl alcohol) asymmetric membranes," Polymer, 2000, vol. 41, pp. 5633-5641.
Kulkarni, S. et al., "Synthesis and Characterization of Hybrid Membranes Using Poly(vinyl alcohol) and Tetraethylorthosilicate for the Pervaporation Separation of Water-Isopropanol Mixtures," Journal of Applied Polymer Science, 2004, vol. 94, pp. 1304-1315.
Baker, Richard W., Membrane Technology and Applications, second edition, New York, Wiley, 2004.
International Search Report issued in PCT/EP2010/05376 filed Mar. 23, 2010, published Oct. 7, 2010.

* cited by examiner

*Primary Examiner* — Ana Fortuna
(74) *Attorney, Agent, or Firm* — RatnerPrestia

(57) ABSTRACT

The invention relates to the use of silane-modified polyvinyl alcohols for producing membranes, characterized in that the silane-modified polyvinyl alcohols can be obtained by a) radically initiated copolymerization of one or more vinyl esters from unbranched or branched carboxylic acids having 1 to 15 C-atoms and one or more ethylenically unsaturated silane compounds selected from the group comprising compounds of the general formulae $CR_2=CR-B-Si(OR')_{3-n}(R'')_n$ (1), or $CR_2=CRC(=O)-D-B-Si(OR')_{3-n}(R'')_n$ (2), wherein B is an aryl, heteroaryl or $(CR_2)_m$ residue, wherein one or more non-neighboring $CR_2$ groups can be replaced by heteroatoms as applicable, D is a heteroatom, R is a hydrogen atom, an alkyl or aryl residue or a heteroatom that is substituted as applicable by a hydrogen atom or an alkyl, aryl residue, OR is an alkoxy, alkylcarboxy or arylcarboxy residue, R" is an alkyl or aryl residue and n 0, 1 or 2 and in 0 to 15, and b) subsequent saponification of the silane-modified vinyl ester copolymerizate obtained in step a).

22 Claims, No Drawings

US 9,074,032 B2

MEMBRANES BASED ON POLYVINYL ALCOHOL

CROSS REFERENCE TO RELATED APPLICATIONS

This application is the national phase filing of international patent application No. PCT/EP2010/053756, filed 23 Mar. 2010, and claims priority of German patent application number 10 2009 002 130.2, filed 2 Apr. 2009, the entireties of which applications are incorporated herein by reference.

FIELD OF THE INVENTION

The invention relates to the use of polyvinyl alcohols for producing membranes, to processes for producing membranes and also to the membranes obtainable thereby and to their use for the separation of mixtures.

BACKGROUND OF THE INVENTION

Membranes are porous solid materials and are used for separating mixtures. One advantage of membrane separation processes is that they can be carried out even at low temperatures, such as room temperature for example, and therefore, compared with thermal separation processes, such as distillation, sublimation or crystallization, have lower energy requirements and the mixture to be separated suffers less thermal stress. Moreover, separations are achievable with the aid of membranes that are not possible with thermal processes because, for example, the presence of azeotropes and of crystal isomorphs rule out respectively a distillative separation and a separation by recrystallization. However, there are issues with limitations concerning the useful life, the separation performance, the flux rates as well as the mechanical properties of membranes and also the costs associated with their production.

Membranes based on polyvinyl alcohols (PVA) or polyvinyl acetates (PVAc) are well known. PVA membranes are used for micro- and ultrafiltration (Chuang, Polymer, 2000, Volume 41, pages 5633 to 5641). JP-A 3030820 describes the production of syndiotactic polyvinyl alcohols from vinyl acetate and optionally further monomers such as vinyloxytrimethylsilane and the use of such polyvinyl alcohols for producing membranes. EP-A 423949 recommends the use of PVA-based membranes for separating azeotropic water-ethanol mixtures. Separation of this type is also known as pervaporation. PVA is particularly useful as membrane material for separating water mixtures owing to its hydrophilic polymeric scaffold. Membrane separation processes applied to water-ethanol mixtures produce 99% by weight pure ethanol. PVA further has a low tendency to adsorb protein, making it possible to reduce membrane fouling, i.e., the accumulation of organic impurities on the membrane.

The separation-selective PVA layer can be situated on a porous support structure, or PVA itself can be made into a porous membrane, for example using phase inversion processes. EP-A 96339 describes PVA membranes which are applied to porous polyacrylonitrile support structures. GB-A 1325227 describes porous PVA membranes produced by the phase inversion process.

In the course of being used to produce PVA membranes, the polyvinyl alcohol used for this purpose is generally subjected to a crosslinking step. This can take the form, for example, of acetalization with dialdehydes, such as glutaraldehyde. Membranes thus obtainable, however, only have a very limited stability, since corresponding acetals can hydrolyze under both acidic and basic conditions, which appreciably limits the usefulness of corresponding membranes with regard to the pH values of the solutions to be separated. Alternatively, crosslinking of polyvinyl alcohol can be effected using diisocyanates or anhydrides, for example maleic anhydride. But even this approach leads to membranes of inadequate stability. Another disadvantage is that the aforementioned crosslinking reagents are poisonous and can only be handled under costly and inconvenient safety precautions on a large industrial scale. Moreover, the PVA membranes thus obtainable swell substantially at temperatures above 70° C. and/or in solutions having high water contents, which impairs the stability, the water flow rate and the selectivity of PVA membranes.

Yet it is specifically when membranes are used to separate mixtures having high water contents that employing temperatures of above 70° C. makes it possible to enhance the space-time yields and the process efficiency. To make this possible, for example, the production of PVA membranes by crosslinking of PVA with tetraethyl orthosilicate is recommended (Karin Kul, Applied Polymer Science, 2004, Volume 94, pages 1304 to 1315). However, even PVA membranes thus obtainable are still not sufficiently stable to hydrolysis. In addition, the membranes are very costly and inconvenient to produce, since the individual starting materials for producing the PVA membrane are usually immiscible, so that a phase separation occurs between PVA and silicate and finally membranes of inhomogeneous composition are obtained, which are unsatisfactory with regard to their swelling behavior and their stability.

SUMMARY OF THE INVENTION

The problem addressed by the present invention was therefore that of providing membranes that have the known advantageous properties of membranes based on polyvinyl alcohol, but not the aforementioned disadvantages.

Surprisingly, this problem was solved by membranes based on silane-modified polyvinyl alcohols, the production of which proceeded from one or more vinyl esters and additionally one or more ethylenically unsaturated silane compounds bearing at least one alkoxy, alkylcarboxy or arylcarboxy group.

DETAILED DESCRIPTION OF THE INVENTION

The invention provides for the use of silane-modified polyvinyl alcohols for producing membranes, characterized in that the silane-modified polyvinyl alcohols are obtainable by a) free-radically initiated copolymerization of one or more vinyl esters of branched or unbranched carboxylic acids having 1 to 15 carbon atoms and one or more ethylenically unsaturated silane compounds selected from the group comprising compounds of the general formulae

$$CR_2=CR-B-Si(OR')_{3-n}(R'')_n \qquad (1)$$

or

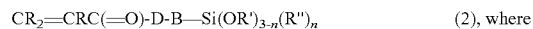

$$CR_2=CRC(=O)-D-B-Si(OR')_{3-n}(R'')_n \qquad (2),$$

where

B represents an aryl, heteroaryl or $(CR_2)_m$ moiety in which optionally one or more nonadjacent $CR_2$ groups may be replaced by heteroatoms, D represents a heteroatom, R represents a hydrogen atom, an alkyl or aryl moiety or a heteroatom which optionally is substituted with a hydrogen atom or with an alkyl or aryl moiety, OR' represents an alkoxy, alkylcarboxy or arylcarboxy moiety, R" represents an alkyl or aryl moiety, and n is 0, 1 or 2 and m is from 0 to 15, and b) subsequent saponification of the silane-modified vinyl ester copolymers obtained in step a).

It is an essential feature of the present invention that, to prepare the silane-modified polyvinyl alcohols, at least one ethylenically unsaturated silane compound having at least one OR' group is used and that the silicon atoms of the silane units are preferably attached to the polymer chain of the silane-modified polyvinyl alcohols via carbon-carbon bonds.

Examples of suitable vinyl esters are vinyl acetate, vinyl propionate, vinyl 2-ethylhexanoate, vinyl laurate, 1-methylvinyl acetate, vinyl pivalate and vinyl esters of alpha-branched monocarboxylic acids having 5 to 15 carbon atoms, for example VeoVa9® and VeoVa10® (from Resolutions). Vinyl acetate is particularly preferable.

The amount of vinyl ester used in step a) to produce the silane-modified vinyl ester copolymers is preferably in the range from 50 to 90 mol %, more preferably in the range from 60 to 99 mol % and most preferably in the range from 80 to 90 mol %, based on the total amount of monomers in step a).

In the ethylenically unsaturated silane compounds, preferred moieties R are hydrogen or alkyl moieties having 1 to 12 carbon atoms, more particularly hydrogen or methyl moieties. Preferred OR' moieties are methoxy, ethoxy, propoxy, butyloxy or acetoxy. Preferred R" moieties are alkyl or aryl having 1 to 12 carbon atoms, more particularly methyl, ethyl, propyl or phenyl.

Examples of suitable aryl or heteroaryl moieties are phenyl or imidazole moieties. Examples of heteroatoms are oxygen, sulfur or N—R groups, where R can assume the aforementioned meanings.

Preferred values of n are 0 or 1 and 0 is the particularly preferable value of n. Preferred values of m are from 0 to 3, and the particularly preferable value of m is 0.

Examples of suitable silanes are vinyltrimethoxysilane, vinyldimethoxymethylsilane, vinyldimethylmethoxysilane, vinyltriethoxysilane, vinyldiethoxymethylsilane, vinyldimethylethoxysilane, vinyltriisopropoxysilane, vinyldiisopropoxymethylsilane, vinyldimethylisopropoxysilane, vinyltributoxysilane, vinyldibutoxymethylsilane, vinyldimethylbutoxysilane, vinyltriacetoxysilane, gamma-acryloyl- or gamma-methacryloyloxy-isopropyltrialkoxysilane, gamma-methacryloyloxy-methyldi(alkoxy)methylsilane, gamma-methacryloyloxy-dimethyl(alkoxy)silane, alpha-methacryloyloxy-methyltri(alkoxy)silane, alpha-methacryloyloxy-methyldi(alkoxy)methylsilane and alpha-methacryloyloxy-dimethyl(alkoxy)silane.

Silane compounds of formula (1) are preferable. Particularly preferable silane compounds are vinyltrimethoxysilane, vinyltriethoxysilane, vinyltriisopropoxysilane and vinyltributoxysilane.

The amount of silane compounds is preferably in the range from 0.1 to 30 mol %, more preferably in the range from 5 to 20 mol % and most preferably in the range from 10 to 20 mol %, based on the total amount of monomers in step a).

Step a) may additionally utilize, as further monomers, one or more monomers from the group comprising methacrylic esters and acrylic esters of alcohols having 1 to 15 carbon atoms, olefins, dienes, vinylaromatics and vinyl halides.

Examples of suitable monomers from the group of esters of acrylic acid or methacrylic acid are esters of branched or unbranched alcohols having 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, isobutyl acrylate, t-butyl acrylate, n-butyl methacrylate, isobutyl methacrylate, t-butyl methacrylate, 2-ethylhexyl acrylate and also norbornyl acrylate. Particular preference is given to methyl acrylate, methyl methacrylate, n-butyl acrylate, isobutyl acrylate, t-butyl acrylate, 2-ethylhexyl acrylate and norbornyl acrylate. Examples of suitable dienes are 1,3-butadiene and isoprene. Examples of suitable olefins are ethene and propene. Examples of suitable vinylaromatics are styrene and vinyltoluene. Examples of suitable vinyl halides are vinyl chloride, vinylidene chloride or vinyl fluoride, preference being given to vinyl chloride.

The proportion of further monomers is preferably in the range from 0 to 20 mol %, based on the total amount of monomers in step a).

If desired, auxiliary monomers can additionally be present in a proportion of preferably 0.01 to 20 mol %, based on the total amount of monomers in step a). Examples are ethylenically unsaturated mono- and dicarboxylic acids. Preference is given to crotonic acid, acrylic acid, methacrylic acid, fumaric acid and maleic acid. Further examples are ethylenically unsaturated carboxylic amides and nitriles, preferably N-vinylformamide, acrylamide and acrylonitrile. Preference is further given to cyclic amides, for example N-vinylpyrrolidone, mono- and diesters of fumaric and maleic acid such as, for example, diethyl and diisopropyl ester and maleic anhydrides, ethylenically unsaturated sulfonic acids or salts thereof, preferably vinylsulfonic acid, 2-acrylamido-2-methylpropanesulfonic acid. Further monomers likewise include cationic monomers, for example diallylammonium chloride (DADMAC), 3-trimethylammonium propyl(meth)acrylamide chloride (MAPTAC) and 2-trimethylammonium ethyl (meth)acrylate chloride. Further suitable auxiliary monomers include vinyl ethers, vinyl ketones, and also vinylaromatic compounds with or without incorporated heteroatoms. Auxiliary monomers which are further likewise preferable are functionalized(meth)acrylates, more particular epoxy-functional ones such as, for example, glycidyl acrylates, glycidyl methacrylates, allyl glycidyl ether, vinyl glycidyl ether or hydroxyalkyl-functional ones such as hydroxyethyl(meth) acrylate or substituted or unsubstituted aminoalkyl(meth) acrylates. Preference is likewise given to postcrosslinking comonomers such as, for example, acrylamidoglycolic acid (AGA), methyl methylacrylamidoglycolate (MAGME), N-methylolacrylamide (NMA), N-methylolmethacrylamide, N-methylolallyl carbamate, alkyl ethers such as, for example, isobutoxy ethers or esters of N-methylolacrylamide, and also of N-methylolmethacrylamide and of N-methylolallyl carbamate. Further suitable auxiliary monomers are polyethylenically unsaturated compounds, for example divinyl adipate, diallyl maleate, allyl methacrylate, butanediol acrylate and triallyl cyanurate.

The silane-modified vinyl ester copolymers are obtainable by common methods of polymerization, as described for example in DE-A 10140131 or DE-A 102004026609. The polymerization is preferably carried out without a solvent, in suspension, in emulsion or more preferably in solvents. Organic solvents preferable for a solvent polymerization are esters, such as methyl acetate and ethyl acetate, or more preferably alcohols, such as methanol, ethanol, n-propanol, isopropanol, n-butanol and t-butanol.

The saponification in step b), also known under the term hydrolysis, is carried out in a conventional manner e.g. by the belt or kneader process, in the alkaline or acidic region by addition of an acid or a base. The saponification preferably takes place in the basic region, for example by addition of alkali or alkaline earth metal hydroxides or alkoxides, such as sodium hydroxide, potassium hydroxide, sodium methoxide or lithium methoxide. Saponification with lithium methoxide or sodium hydroxide is particularly preferable. The saponification is preferably carried out in a solvent, more particularly in water, in one or more alcohols or a mixture of water and one or more alcohols. The base is typically used in an amount of 1 to 10 mol % based on the ester units of the silane-modified vinyl ester copolymer. The saponification is preferably carried out at temperatures between 20 and 90° C. After hydrolysis, the solvent can be distilled off and the silane-modified polyvinyl alcohol obtained in the form of a powder. However, the silane-modified polyvinyl alcohol can further also be further processed in the solvent or solvents of the saponification. However, it is also possible to carry out a solvent exchange by gradually adding a second solvent, preferably water, while distilling off the first solvent, to obtain solutions of the silane-modified polyvinyl alcohol in the second solvent, or in mixtures thereof.

Silane-modified vinyl ester copolymers are referred to as fully saponified when the degree of hydrolysis of the polymers in question is more than 96 mol %. The degree of hydrolysis indicates the proportion of vinyl ester units of the silane-modified vinyl ester copolymers which was converted into vinyl alcohol units in the course of the saponification. Partially saponified silane-modified vinyl ester copolymers have a degree of hydrolysis of more than 20 mol % and less than 96 mol %. The partially or fully saponified silane-modified vinyl ester copolymers preferably have a degree of hydrolysis in the range from 50 mol % to 99.99 mol %, more preferably in the range from 70 to 99.99 mol % and most preferably in the range from 90 to 99.99 mol %.

Step b) comprises hydrolyzing preferably ≤90%, more preferably ≤80%, even more preferably ≤70% and most preferably ≤50% of the hydrolyzable silicon bonds in the silane units of the silane-modified vinyl ester copolymers, based on the total number of hydrolyzable silicon bonds in the silane compounds. Hydrolyzable silicon bonds for the purposes of the present invention are Si—OR' bonds, the hydrolysis of which leads to Si—OH bonds.

The viscosity of the silane-modified polyvinyl alcohols (DIN 53015, Höppler method, 4% by weight in water, 20° C.) is between 1 mPa to 1200 mPa, preferably between 1 mPa to 100 mPa and more preferably between 1 mPa to 40 mPa. The degree of polymerization is preferably at least 35, preferably at least 100 and more preferably at least 150.

To produce the membranes of the present invention, the silane-modified polyvinyl alcohols are preferably used in the form of solutions in one or more organic solvents and/or one or more inorganic solvents.

Preferred organic solvents for this are hydrocarbons, halogenated hydrocarbons, ethers, alcohols, ketones, acids, esters, nitrogen-containing solvents and sulfur-containing solvents.

Examples of suitable hydrocarbons are pentane, hexane, dimethylbutane, heptane, 1-hexene, 1,5-hexadiene, cyclohexane, terpentine, benzene, isopropylbenzene, xylene, toluene, naphthalene, and also tetrahydronaphthalene. Examples of suitable halogenated hydrocarbons are fluoroform, perfluoroheptane, methylene chloride, chloroform, carbon tetrachloride, 1,2-dichloroethane, 1,1,1-trichloroethane, pentyl chloride, bromoform, 1,2-dibromoethane, methylene iodide, fluorobenzene, chlorobenzene and also 1,2-dichlorobenzene. Examples of suitable ethers are diethyl ether, butyl ethyl ether, anisole, diphenyl ether, ethylene oxide, tetrahydrofuran, furan and also 1,4-dioxane. Examples of suitable alcohols are methanol, ethanol, isopropanol, butanol, octanol, cyclohexanol, benzyl alcohol, ethylene glycol, ethylene glycol monomethyl ether, propylene glycol, butylglycol, glycerol, phenol and also m-cresol. Examples of suitable ketones are acetone, diisobutyl ketone, butan-2-one, cyclohexanone and also acetophenone. Examples of suitable acids are formic acid and acetic acid. Examples of suitable esters are methyl acetate, ethyl acetate, butyl acetate, phenyl acetate, glycerol triacetate, diethyl oxalate, dioctyl sebacate, methyl benzoate, dibutyl phthalate and also tricresyl phosphate. Examples of suitable nitrogen-containing solvents are nitromethane, nitrobenzene, butyronitrile, acetonitrile, benzonitrile, malononitrile, hexylamine, aminoethanol, N,N-dimethylaminoethanol, aniline, pyridine, N,N-dimethylaniline, N,N-dimethylformamide, N-methylpiperazine and also 3-hydroxypropionitrile. Examples of suitable sulfur-containing solvents are carbon sulfide, methanethiol, dimethyl sulfone, dimethyl sulfoxide and also thiophene.

Examples of suitable inorganic solvents are water, ammonia, hydrazine and sulfur dioxide.

The silane-modified polyvinyl alcohols are preferably dissolved in solvent mixtures and more preferably dissolved in aqueous solvent mixtures. Examples of preferred aqueous solvent mixtures are mixtures of water and one or more solvents selected from the group comprising amines, alcohols, amides, ethers and sulfoxides. Examples of particularly preferred aqueous solvent mixtures are mixtures of water and one or more solvents selected from the group comprising N-methylpiperazine, aminoethanol, N,N-diethylaminoethanol, dimethylformamide, methanol, ethanol, isopropanol, tetrahydrofuran and also dimethyl sulfoxide. The volume ratio of water to the organic solvents in these mixtures is preferably in the range from 10:1 to 1:10 and more preferably in the range from 10:1 to 6:4.

The most preferred solvent mixtures are mixtures of water and N-methylpiperazine and also one or more further solvents selected from the group comprising aminoethanol, N,N-diethylaminoethanol, dimethylformamide, tetrahydrofuran, dimethyl sulfoxide; water and N,N-diethylaminoethanol and also one or more further solvents selected from the group comprising dimethylformamide, tetrahydrofuran, dimethyl sulfoxide; water, dimethylformamide and also one or more further solvents selected from the group comprising aminoethanol and dimethyl sulfoxide. Preferred mixing ratios of the most preferred solvent mixtures consisting of water, a solvent from the group N-methylpiperazine, N,N-dimethyaminoethanol and dimethylformamide and also one more of the aforementioned solvents is in the range from 9:1:1 to 1:2:3, more preferably in the range from 4:1:1 to 1:2:2 and most preferably 1:1:1.

To prepare the solutions of silane-modified polyvinyl alcohols in the aforementioned solvent or solvents, one option is for example to initially charge the solvent or solvent mixture and to add the silane-modified polyvinyl alcohol. Preferably, the silane-modified polyvinyl alcohols are initially charged and the solvent or solvent mixture is added. It is particularly preferable for the silane-modified polyvinyl alcohols to be initially charged, dissolved in one or more organic solvents and then admixed with water. Dissolving the silane-modified polyvinyl alcohols in the solvents can be speeded by heating. Preferred temperatures for this are in the range from 10 to 160° C., more preferably in the range from 30 to 100° C. and most preferably in the range from 40 to 80° C.

The solutions of silane-modified polyvinyl alcohols have a silane-modified polyvinyl alcohol content of preferably from 1% to 70% by weight, more preferably from 2% to 30% by weight and most preferably from 5% to 10% by weight, based on the weight of solutions of silane-modified polyvinyl alcohols.

The solutions of silane-modified polyvinyl alcohols may contain one or more further additives, for example inorganic salts or organic polymers. Examples of suitable inorganic salts are alkali metal halide, alkaline earth metal halide, zinc salts or cadmium salts, more particularly LiF, NaF, KF, LiCl, NaCl, KCl, $MgCl_2$, $CaCl_2$, $ZnCl_2$ or $CdCl_2$. Organic polymers used are preferably water-soluble polymers, for example polyethylene glycols, polypropylene glycols, poly(propylene-ethylene) glycols, polyvinyl-pyrrolidines, polyvinyl alcohols or sulfonated polystyrenes. These additives can be used to influence the hydrophilicity and/or hydrophobicity of the membrane.

The proportions in which the additives are present in the solutions of silane-modified polyvinyl alcohols are preferably in the range from 0.01% to 50% by weight, more preferably in the range from 0.1% by weight to 15% by weight and most preferably in the range from 1% to 5% by weight, based on the weight of solutions of silane-modified polyvinyl alcohols. Preferred solutions contain alkali metal halides, alkaline earth metal halides, more particularly 2% by weight of LiCl, and polyvinylpyrrolidone and more particularly 3% by weight of polyvinylpyrrolidone.

The solutions of silane-modified polyvinyl alcohols may contain one or more addition agents, for example alkoxy-functional silanes of general formulae (3) or (4)

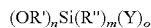 (3) where n is 1, 2, 3 or 4,
m is 0, 1, 2 or 3,
o is 0, 1, 2 or 3,
with the proviso that the sum total of n, m and o is 4, or

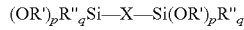 (4) where p is 1, 2 or 3 and
q is 0, 1 or 2,
with the proviso that the sum total of p and q is 3, and where OR' and R" are each as defined above and Y represents an OH function, an optionally halogen-, hydroxyl-, amino-, epoxy-, phosphonates-, thiol-, carbamate-substituted carbon atom chain of 1-18 carbon atoms, wherein the alkyl moiety may be interrupted by nonadjacent oxygen, sulfur or NR groups, and X represents a carbon atom chain of 1-18 carbon atoms, wherein the carbon chain may be interrupted by nonadjacent oxygen, sulfur or NR groups.

Examples of suitable alkoxy-functional silanes of formulae (3) and (4) comprise tetramethoxysilane, tetraethoxysilane, tetrapropoxysilane, tetrabutoxy-silane, methyltrimethoxysilane, methyltriethoxysilane, ethyltrimethoxysilane, ethyltriethoxysilane, propyltrimethoxysilane, propyltriethoxysilane, propyldiethoxymethylsilane, propyldimethoxymethylsilane, dimethyldimethoxysilane, dimethyldiethoxysilane, trimethylmethoxysilane, trimethylethoxysilane, phenyltrimethoxysilane, phenyltriethoxysilane; amino-functional silanes, for example aminopropyltrimethoxy-silane, aminopropyltriethoxysilane, aminoethylamino-propyltrimethoxysilane, aminoethylaminopropyltriethoxy-silane, ortho-aminophenyltriethoxysilane, meta-aminophenyltriethoxysilane, para-aminophenyltriethoxysilane, ortho-aminophenyltrimethoxysilane, meta-aminophenyltrimethoxysilane, para-aminophenyltrimethoxysilane, cyclohexylaminopropyltrimethoxysilane, cyclohexylamino-propyltrimethoxysilane, N,N-dimethylamino-propyltrimethoxysilane, N,N-dimethylaminopropyltriethoxysilane, aminomethyltrimethoxysilane, aminomethyl-methyldimethoxysilane, aminomethyldimethylmethoxy-silane, aminomethyltriethoxysilane, aminomethylmethyl-diethoxysilane, aminomethyldimethylethoxysilane, cyclohexylaminomethyltrimethoxysilane, anilinomethyl-trimethoxysilane, N-piperazinomethyltrimethoxysilane, N-piperazinomethyltriethoxysilane, N-piperazinomethyl-methyldimethoxysilane, N-piperazinomethylmethyldieth-oxysilane, N-piperazinomethyldimethylmethoxysilane, N-piperazinomethyldimethylethoxysilane, N,N-dimethylaminomethyltrimethoxysilane, N-benzimidazolylpropyl-trimethoxysilane, N-benzimidazolylpropyltriethoxy-silane, N-imidazolyltrimethoxysilane, N-imidazolyltriethoxysilane; epoxy-functional silanes, such as 3-glycidoxypropyltrimethoxysilane, 3-glycidoxypropyltriethoxysilane, 5,6-epoxyhexyltrimethoxysilane, 5,6-epoxyhexyl-triethoxysilane, 2-(3,4-epoxycyclohexyl)ethyltrimethoxysilane or 2-(3,4-epoxycyclohexyl)ethyltriethoxysilane; chlorosilanes, such as chloromethyldimethyl-methoxysilane, chloromethylmethyldimethoxysilane, chloromethyltrimethoxysilane, chloromethyldimethyl-ethoxysilane, chloromethylmethyldiethoxysilane, chloro-methyltriethoxysilane, chloropropyldimethylmethoxy-silane, chloropropylmethyldimethoxysilane, chloro-propyltrimethoxysilane, chloropropyldimethylethoxy-silane, chloropropylmethyldiethoxysilane and chloro-propyltriethoxysilane; isocyanate-functional silanes, for example methylisocyanatotrimethoxysilane, methyl-isocyanatotriethoxysilane, methylisocyanatodimethoxy-methylsilane, methylisocyanatodiethoxymethylsilane, methylisocyanatomethoxydimethylsilane, methyliso-cyanatoethoxydimethylsilane, propylisocyanatotrimeth-oxysilane, propylisocyanatotriethoxysilane, propylisocyanatodimethoxymethylsilane, propylisocyanatodiethoxymethylsilane, propylisocyanatomethoxydimethylsilane and propylisocyanatoethoxydimethylsilane; bisalkoxy- or bisacetoxysilanes, such as bis(trimethoxysilyl)methane, bis(dimethoxymethylsilyl)methane, bis(methoxydimethyl-silyl)methane, bis(triethoxysilyl)methane, bis(diethoxymethylsilyl)methane, bis(ethoxydimethylsilyl)-methane, bis(trimethoxysilyl)ethane, bis(dimethoxy-methylsilyl)ethane, bis(methoxydimethylsilyl)ethane, bis(triethoxysilyl)ethane, bis(diethoxymethylsilyl)-ethane, bis(ethoxydimethylsilyl)ethane, bis(trimethoxy-silyl)octane, bis(dimethoxymethylsilyl)octane, bis(methoxydimethylsilyl)octane, bis(triethoxysilyl)-octane, bis(diethoxymethylsilyl)octane, bis(ethoxy-dimethylsilyl)octane, bis(trimethoxysilylpropyl)amine, bis(dimethoxymethylsilylpropyl)amine, bis(methoxy-dimethylsilylpropyl)amine, bis(triethoxysilylpropyl)-amine, bis(diethoxymethylsilylpropyl)amine and bis(ethoxydimethylsilylpropyl)amine.

The amount in which the addition agents are present in the solutions of silane-modified polyvinyl alcohols is preferably ≤50% by weight, more preferably in the range from 0.1% by weight to 20% by weight and most preferably in the range from 0.1% to 10% by weight, based on the weight of silane-modified polyvinyl alcohols.

The solutions of silane-modified polyvinyl alcohols may contain further common auxiliaries, for example flow control agents, surface-active substances, adhesion promoters, photoprotectants, such as UV absorbers and/or free-radical scavengers, thixotropic agents, biocides, such as fungicides or bactericides, more particularly methylisothiazolones or benzisothiazolones, and also further solid and filler materials.

The solutions of silane-modified polyvinyl alcohols optionally contain one or more crosslinking catalysts.

Examples of suitable crosslinking catalysts are organic tin compounds, such as dibutyltin dilaurate, dioctyltin dilaurate, dibutyltin diacetylacetonate, dibutyltin diacetate or dibutyltin dioctoate; organic titanates, such as titanium(IV) isopropoxide; iron(III) compounds, such as iron(III) acetylacetonate; amines, such as triethylamine, tributylamine, 1,4-diazabicyclo[2,2,2]-octane, 1,8-diazabicyclo[5.4.0]undec-7-ene, 1,5-diazabicyclo[4.3.0]non-5-ene, N,N-bis(N,N-dimethyl-2-amino-ethyl)methylamine, N,N-dimethylcyclohexylamine, N,N-dimethylphenylamine; organic or inorganic Brönstedt acids, such as acetic acid, trifluoroacetic acid, hydrochloric acid, phosphoric acid or its mono- or diesters, for example butyl phosphate, isopropyl phosphate, dibutyl phosphate; acyl chlorides, such as benzoyl chloride; organic or inorganic Brönstedt bases, such as lithium hydroxide, sodium hydroxide, potassium hydroxide, ammonia, trialkylamines, for example trimethylamine. Hydrochloric acid is preferable.

The amounts in which the crosslinking catalysts are used are preferably in the range from 0% to 10% by weight and more preferably in the range from 0.01% to 10% by weight, based on the weight of silane-modified polyvinyl alcohols.

The invention further provides flat sheet membranes obtainable by applying one or more solutions of silane-modified polyvinyl alcohols to a substrate and also drying and crosslinking the applied silane-modified polyvinyl alcohols.

The invention further provides processes for production of flat sheet membranes by applying one or more solutions of silane-modified polyvinyl alcohols to a substrate and also drying and crosslinking the applied silane-modified polyvinyl alcohols.

The substrates preferably contain one or more substances from the group comprising metals, metal oxides, polymers or glass. The substrates can be used in the form of plates, foils, woven or preferably nonwoven nets or more preferably in the form of fibrous nonwoven webs.

Substrates based on metal contain for example titanium, iron, copper, aluminum or alloys containing the aforementioned metals. Substrates based on metal oxides contain for example silicon oxide, aluminum oxide, zirconium oxide or titanium oxide, or mixtures of these metal oxides. Substrates based on polymers contain for example polyamides, polyimides, polyetherimides, polycarbonates, polylbenzimidazoles, polyethersulfones, polyesters, polysulfones, polytetrafluoroethylenes, polyurethanes, polyvinyl chlorides, cellulose acetates, polyvinylidene fluorides, polyether glycols, polyethylene terephthalate (PET), polyaryletherketones, polyacrylonitrile, polymethyl methacrylates, polyphenylene oxides, polycarbonates, polyethylenes or polypropylenes. Preference is given to polymers having a glass transition temperature Tg of at least 80° C.

Substrates based on glass contain for example quartz glass, lead glass, float glass or lime-soda glass.

Preferred net or web substrates contain glass, carbon, aramid, polyester, polyethylenes, polypropylenes, polyethylenes/polypropylenes copolymer or polyethylene terephthalate fibers.

The layer thickness of substrates is preferably ≥1 µm, more preferably ≥50 µm and even more preferably ≥100 µm and preferably ≤2 mm, more preferably ≤600 µm and even more preferably ≤400 µm. The most preferred ranges for the layer thickness of substrates are the ranges formulatable from the aforementioned values.

The substrates are preferably porous. Porous substrates have pore diameters of preferably 1 nm to 5 µm and more preferably of 5 nm to 500 nm. Porous substrates are preferably polymers or metal oxides. Porous substrates have an asymmetrical porous structure, i.e., the pores have different diameters along the cross section through the porous substrate. Microfiltration, ultrafiltration or nanofiltration membranes are particularly useful as porous substrates.

Particularly preferred substrates consist of fibrous webs that additionally have a porous coating on the surface. The porous coating preferably consists of polysulfone, polyethersulfone, polyimide, cellulose acetate, polytetrafluoroethylene, polyvinylidene fluoride or polyurethane. The thickness of the porous coating is preferably at least 20 µm, more preferably at least 150 µm, even more preferably at least 500 µm and yet even more preferably between 50 and 150 µm.

The surfaces of substrates can be modified with further substances, for example with flow control agents, surface-active substances, adhesion promoters or photoprotectants, such as UV absorbers and/or free-radical scavengers. The substrates may further have been pretreated with ozone or UV light.

The temperatures at which solutions of silane-modified polyvinyl alcohols are applied to the substrate are preferably ≥0° C., more preferably in the range from 20 to 60° C. and most preferably in the range from 20 to 50° C. In one preferred embodiment, the substrate is conditioned to a temperature in the range from 20 to 25° C. and the solutions of silane-modified polyvinyl alcohols are conditioned to a temperature in the range from 40 to 60° C.

The solutions of silane-modified polyvinyl alcohols are preferably applied to the substrate using a blade or via meniscus coating, casting, spraying, screen printing, gravure printing or spin-on-disk. The solutions thus applied are hereinafter also referred to as silane-modified polyvinyl alcohol films and have film thicknesses of preferably ≥1 µm, more preferably ≥20 µm, even more preferably ≥50 µm and preferably ≤2000 µm, more preferably ≤500 µm and yet even more preferably ≤300 µm. The most preferred ranges for the film thickness are the ranges formulatable from the aforementioned values.

The substrates provided with silane-modified polyvinyl alcohol films and hereinafter also referred to as membrane precursors can then be further processed by drying and crosslinking (variant A) or by a phase inversion process (also known under the name of Loeb-Sourirajan process) (variant B)) to form flat sheet membranes. In the course of crosslinking, the silane-modified polyvinyl alcohols generally form C—Si—O—Si—C bonds via their silane units. Volatile constituents, such as solvents, are typically removed partially or completely in the course of drying by evaporation.

In variant A), the temperatures at which the membrane precursors are dried and crosslinked are preferably between 20 and 200° C. and more preferably between 20 and 150° C. Drying and crosslinking can be carried out at any desired pressures, such as reduced pressure, superatmospheric pressure or atmospheric pressure. Drying and crosslinking duration depends on whether a crosslinking catalyst is present and also on the type and amount of crosslinking catalyst used, and is typically in the range from one minute to several hours, preferably in the range up to 24 hours and more preferably in the range up to 13 hours.

If desired, postcrosslinking can be carried out by exposing the product thus obtained to an atmosphere containing acids or acid anhydrides, for example sulfuric acid, hydrochloric acid, maleic anhydride, hydrobromic acid or mixtures thereof. Postcrosslinking can also be effected by irradiating with gamma rays. In this way, the stability and selectivity of membranes can be further improved.

Following drying and crosslinking, the optionally used crosslinking catalysts can be deactivated, for example by addition of catalyst poisons, such as acids or bases known to a person skilled in the art.

The products thus obtained can be used directly as membranes for separating mixtures. Alternatively, the dried and crosslinked silane-modified polyvinyl alcohols films thus obtained can be removed from the substrate and optionally applied to other substrates, such as fibrous nonwoven webs, preferably at elevated temperatures and by application of pressure, for example in a hot press or in a laminating appliance. To improve the adherence to the other substrates, adhesion promoters can be used.

In variant B), the membranes are produced by a phase inversion process. To this end, the membrane precursors are initially introduced into a coagulation medium. The coagulation medium is preferably a liquid in which the solubility of silane-modified polyvinyl alcohols at 20° C. is ≤5% by weight.

Preferred coagulation media are one or more solvents from the group comprising alcohols, ketones or nitrogen-containing solvents. Particular preference is given to one or more solvents selected from the group comprising alcohols, such as methanol, ethanol, butanol or isopropanol, nitrogen-containing solvents, such as acetonitrile or N-methyl-2-pyrrolidone (NMP) or ketones, such as acetone. Isopropanol or acetone are most preferable. The pH of coagulation media is preferably ≥8 or ≤6. The pH can be set using acids, bases or buffers known to a person skilled in the art.

The coagulation media temperature is preferably in the range from 0 to 80° C., more preferably in the range from 0 to 30° C. and most preferably in the range from 23 to 26° C.

The coagulation media may contain further constituents, for example inorganic salts, more particularly sodium sulfate. Therebesides, the coagulation media may also contain further constituents recited above as additives, addition agents or auxiliaries for the solutions of silane-modified polyvinyl alcohols. The coagulation medium may further also contain surface-active substances. The concentration of aforementioned further constituents in the coagulation medium is preferably up to 10% by weight, based on the total mass of coagulation medium.

The membrane precursors may be predried, preferably at temperatures of at least 10° C., more preferably at 25 to 150° C. and most preferably at 20 to 100° C., before being dipped into the coagulation medium. The predrying time is preferably up to 10 minutes, more preferably 7 seconds to 10 minutes and most preferably 10 seconds and 60 seconds.

The membrane precursor time in the coagulation medium is preferably in the range from 10 s to 20 h, more preferably at least 30 s to 60 min and most preferably 3 to 7 min.

Thereafter, the membrane precursors thus treated are removed from the coagulation medium and subjected to a drying and crosslinking operation under the conditions already described as variant A). Membranes are finally obtained in this way.

Membranes produced by the phase inversion process generally have a porous structure. The free volume is preferably in the range from 5% to 90% by volume, more preferably in the range from 20% to 80% by volume and most preferably in the range from 35% by volume to 75% by volume.

The invention further provides hollow fiber membranes obtainable by spinning solutions of silane-modified polyvinyl alcohols and also drying and crosslinking the silane-modified polyvinyl alcohols.

The invention further provides processes for production of hollow fiber membranes by spinning solutions of silane-modified polyvinyl alcohols and final drying and crosslinking.

Spinning is understood by a person skilled in the art to mean the production of fibers by jetting polymer solutions through hollow fiber spinning jets. Hollow fibers are known per se to a person skilled in the art, and are generally cylindrical fibers having one or more continuous void spaces in cross section; such void spaces are also referred to as channels.

The outer diameter of hollow fibers is preferably in the range from 10 μm to 5 mm, more preferably in the range from 100 μm to 2 mm and most preferably in the range from 300 μm to 1000 μm. The inner diameter of hollow fibers, i.e., the channel diameter, is preferably in the range from 8 μm to 4.5 mm, more preferably in the range from 80 μm to 1.9 mm and most preferably in the range from 280 μm to 900 μm. The hollow fibers may have any desired length.

During the production of a hollow fiber membrane, the void spaces in the hollow fibers typically contain a gas, a gas mixture or a liquid, preferably air, more preferably compressed air, or nitrogen, oxygen, carbon dioxide, water or organic solvents, such as hydrocarbons, halogenated hydrocarbons, ethers, alcohols, ketones, acids, esters, nitrogen-containing solvents or sulfur-containing solvents. It is particularly preferable for the void spaces to be filled with toluene. This prevents collapsing the void spaces in hollow fibers. This further controls whether crosslinking the silane-modified polyvinyl alcohol takes place on the inside surface or on the outside surface of the hollow fiber or alternatively within the hollow fiber.

Spinning preferably takes place at temperatures of 20 to 150° C. Hollow fibers may optionally be produced by co-spinning one or more further polymeric plies. Multiply hollow fiber membranes are obtained in this way.

The hollow fibers thus obtained are also referred to as membrane precursors which can then be further processed by drying and crosslinking (variant A)) or by the phase inversion process (variant B)) to form hollow fiber membranes—as described above for flat sheet membranes.

The layer of membranes according to the present invention which contains crosslinked silane-modified polyvinyl alcohols preferably consists of the crosslinked silane-modified polyvinyl alcohols to an extent of at least 50% by weight, more preferably at least 80% by weight, even more preferably at least 90% by weight and most preferably at least 95% by weight, based on the total mass of the aforementioned layer.

In the membranes, preferably 10 to 90% and more preferably 60 to 90% of the silicon atoms of the originally used silane-modified polyvinyl alcohols are in a crosslinked state, based on the total number of silicon atoms of the silane-modified polyvinyl alcohols used. Crosslinking of silicon atoms is generally to be understood as meaning the formation of C—Si—O—Si—C bonds. The extent of crosslinking can be controlled via the number of hydrolyzable silicon bonds, i.e., the crosslinking groups in the silane units or via the proportion of silane units in silane-modified polyvinyl alcohols.

The membranes of the present invention have layer thicknesses based on silane-modified polyvinyl alcohols of preferably 0.1 to 2000 μm, more preferably 1 to 750 μm, even more preferably from 5 to 100 μm and most preferably from 5 to 20 μm.

The membranes thus obtained can be used directly for separating mixtures or alternatively be subjected to a further, common aftertreatment, for example a thermal treatment, treatment with high or low pressure plasma, irradiation with gamma, X-ray, microwave or actinic radiation or a surface modification, for example surface coating.

Thickness for the surface coating on membranes is preferably in the range from 10 nm to 500 μm, more preferably in the range from 100 nm to 50 μm and most preferably in the range from 500 nm to 10 μm. Useful coating ingredients include for example polymers such as polyamides, polyimides, polyetherimides, polycarbonates, polybenzimidazoles, polyethersulfones, polyesters, polysulfones, polytetrafluoroethylenes, polyurethanes, silicones, polydimethylsilicones, polymethylphenylsilicones, polymethyloctylsilicones, polymethylalkylsilicones, polymethylarylsilicones, polyvinyl chlorides, polyether glycols, polyethylene terephthalate (PET), polyaryletherketones, polyacrylonitrile, polymethyl methacrylates, polyphenylene oxides, polycarbonates, polyethylenes or polypropylenes. The polymers can be applied to the membranes using customary methods, for example by laminating, spraying, blade coating or adhering. Such a coating is preferably applied to membranes having pores in the range from 10 nm to 5 μm.

The membranes of the present invention are useful for any common process for separating mixtures using membranes, such as reverse osmosis, gas separation, pervaporation, nanofiltration, ultrafiltration or microfiltration. The membranes of the present invention can be used to effect solid-solid, gaseous-gaseous, solid-gaseous or liquid-gaseous mixtures and more particularly liquid-liquid and liquid-solid mixtures. The process of the present invention provides membranes having compact structures or else having porous structures.

The membranes of the present invention have advantageous performance characteristics when used as auxiliaries for separating mixtures. The membranes of the present invention swell to a distinctly lower degree than conventional membranes in the presence of solvents, such as water, even at temperatures above 70° C. The membranes of the present invention are characterized by a relatively high stability to hydrolysis. The membranes of the present invention are notable for a high and selective permeability to water, a superior separation of ethanol-water mixtures, for a high separation performance, separation selectivity and a high throughput of mixture to be separated.

The membranes of the present invention are particularly useful for the purification of aqueous mixtures. The membranes of the present invention exhibit high separation performances when separating water-ethanol, water-isopropanol, water-methanol, water-acetic acid and water-organic ester mixtures and also when separating mixtures of organic solvents, for example toluene-acetone or dichloromethane-ethanol mixtures. The membranes of the present invention are also suitable for removing water from motor fuels, such as gasoline, bioethanol or diesel fuels. In this connection, the membranes have such low space requirements that they can also be installed in vehicles. Further fields of use for the membranes of the present invention are vapor permeation systems for separation of ethanol-water mixtures or for the removal of volatile organic compounds (VOCs) from wastewaters, for example for removal of benzene, acetone, isopropanol, ethanol, methanol, xylenes, toluene, vinyl chloride, hexane, anilines, butanol, acetaldehyde, ethylene glycol, DMF, DMAC, methyl ethyl ketones and also methyl isobutyl ketone. The membranes of the present invention can also be used for removing dissolved substances, such as NaCl, $MgCl_2$ or $CaCl_2$, from water, such as seawater, brackish water, surface water, ultrapure water or industrial wastewaters. The membranes here exhibit not only the desired retention of dissolved salts but also a high flux transfer rate. Particular preference is given to the use of membranes for reverse osmosis to desalinate seawater, brackish water and surface water to recover potable water. The membranes of the present invention are also suitable for cleaning up electrodeposition paint, for example in the automotive industry, protein cleanup, the purification of oil-water emulsions, for example for cooling and lubricating workpieces, and also the industrial water treatment of wastewaters containing particulate impurities, for example residual latex. Further typical applications are the removal of bacteria or viruses from water, the sterile filtration of pharmaceutical products, the sterilization of wine and beer and also the production of particle-free ultrapure water for the electrical industry. Further applications for the membranes of the present invention are described for example in Membrane Technology and Applications, second edition, R. W. Baker, New York, Wiley, 2004.

The membranes, i.e., the flat sheet membranes and the hollow fiber membranes, can be assembled to form the common membrane modules, for example hollow fiber modules, spiral-wound modules, plate modules, cross flow modules or dead end modules.

The examples which follow serve to further elucidate the invention without restricting it in any way.

Unless otherwise stated, pressures are all 0.10 MPa (abs.) and temperatures are all 20° C.

Preparing the Silane-Modified Vinyl Ester Copolymer:
(copolymer 1):

A 1000 ml atmospheric polymerization reactor equipped with an anchor stirrer and a reflux condenser is initially charged with 300 g of methanol, 174.6 g of vinyl acetate (VAc), 60.2 g of vinyltrimethoxysilane (VTMO) and 21.8 g of t-butyl peroxopivalate (75% by weight in aliphatics, half life 1 h at 74° C.). The entire batch is heated to 60° C. in the reactor and maintained therein at 60° C. for 420 min. Thereafter, volatile constituents are removed in a rotary evaporator (60° C., 1 mbar).

Analysis of Solid Resin:
conversion: >99% by weight (based on amount of starting monomers VAc and VTMO); Mw (GPC eluent THF, polystyrene standards) 13 300 g/mol, Mn 12 400 g/mol, dispersity (Mw/Mn) 1.1; glass transition temperature (from DSC measurement) 13° C.

Preparing the Silane-Modified Polyvinyl Alcohols:
si-PVOH 1: (in methanol):

In a 1000 ml round-bottom flask equipped with a reflux condenser 45.7 g of copolymer 1 were dissolved in 456 g of methanol at a temperature of 70° C. Thereafter, 4.6 g of lithium methoxide (75% by weight of methanol) were added and the mixture was subsequently stirred at 60° C. for 60 min. Thereafter, a gradual methanol exchange was carried out to remove acetic acid or acetic ester from the batch. The partially saponified polymer was present as a white solution having a solids content of 7.2% by weight, after the reaction surrounding the methanol exchange.

The solution is notable for an outstanding shelf life of several weeks at room temperature.

Analysis of Silane-Modified Polyvinyl Alcohol:
solids content: 7.2% by weight (methanolic solution), saponification number VZ: 228 mgKOH/g.

si-PVOH 2: (In Aqueous Solution):

In a 1000 ml round-bottom flask equipped with a reflux condenser 51.0 g of the polymer obtained in Example 1 were dissolved in 510 g of methanol at a temperature of 80° C. Thereafter, 5.1 g of lithium methoxide (75% by weight in methanol) were added to the batch and the batch was stirred at 60° C. for 1 h. Upon reaching the gel point the solvent methanol is gradually distilled out of the batch and replaced by the same amount of methanol in order that residues of acetic acid or methyl acetate may be removed for example. Thereafter, the bulk of the methanol is gradually replaced by water at 70° C. and 300 mbar to obtain an aqueous solution which is stable for several weeks.

Analysis of Silane-Modified Polyvinyl Alcohol:
solids content: 4% by weight (aqueous solution) saponification number: 41 mgKOH/g
Production of Membranes:

Inventive Example 1

Producing a Membrane in Solid Material from Si-PVOH 1

Si-PVOH 1 is adjusted with methanol to a solids content of 8.5% by weight. Thereafter, 7.5 g of this solution are admixed with 100 µl of 10% by weight HCl and stirred for 20 s. This solution is poured into a polypropylene dish and dried first at room temperature for 10 min, then at 60° C. for 10 h and subsequently at 100° C. for 2 h.

This provides a flexible high-transparency membrane having a layer thickness of about 20 µm.

Inventive Example 2

Producing a Membrane with Composite Structure from Si-PVOH 1

Si-PVOH 1 is adjusted with methanol to a solids content of 8% by weight. Thereafter, 7.5 g of this solution are admixed with 100 µl of 10% by weight HCl and stirred for 1 min. A portion of the solution is poured onto an ultrafiltration membrane (type: HT450, Tuffryn®, from Pall, area 50 cm², pore diameter 0.45 µm, material: polysulfone). Thereafter, the composite membrane is incipiently dried at room temperature and fully dried at 60° C. for 2 h and at 120° C. for a further 2 h.

This provides a composite membrane having an uninterrupted separation-selective layer, this completely uninterrupted defect-free and flexible separation-selective layer being firmly connected to the ultrafiltration membrane. The thickness of the selective layer is about 10 µm.

Inventive Example 3

Producing a Porous Membrane from Si-PVOH 2

Si-PVOH 2 is adjusted with water and NMP to a solids content of 10% by weight (solution with 80:20 water:NMP mixing ratio). Thereafter, this solution is blade coated onto a glass plate using a chamber-type knife (set to a gap height of 300 µm) and dipped for 2 min into an acetone-filled inversion tank.

Thereafter, the membrane can be air dried and removed from the glass plate. The porous membrane is thermally aftertreated by drying at 60° C. for 8 h and at 120° C. for a further 2 h.

This provides a milkily turbid and flexible membrane which, examined in a scanning electron microscope, has an anisotropic structure in cross section.

The membrane had pores<1 µm on the surface.

Comparative Example 4

Producing a Porous Membrane from Polyvinyl Alcohol

A polyvinyl alcohol (viscosity 3.0 mPas (by Höppler), saponification number VZ 14 mgKOH/g; the polyvinyl alcohol contains no silane units) is used to prepare a 10% by weight solution having an 80:20 water:NMP mixing ratio. Thereafter, this solution is blade coated onto a glass plate using a chamber-type knife (set to a gap height of 300 µm) and dipped into an acetone-filled inversion tank.

Phase separation took place resulting in the formation of porous membrane structures, which manifested in the color change from transparent to milky.

Thereafter, the membrane is air dried and removed from the glass plate. The porous membrane is thermally aftertreated by drying at 60° C. for 8 h and at 120° C. for a further 2 h.

This provides a milkily turbid and flexible membrane which, examined in a scanning electron microscope, has an anisotropic structure in cross section.

Comparative Example 5

Producing a Compact PVA Membrane with Aldehyde Crosslinking 8 g of an aqueous solution having a polyvinyl alcohol solids content of 10% by weight (viscosity (by Höppler) 3.0 mPas, VZ 14 mgKOH/g) is admixed with 0.5 g of glutaraldehyde and 0.1 g of 10% by weight HCl and poured into a round polypropylene dish. Crosslinking takes place as in inventive Examples 1 to 2 at 60° C. for 2 h and subsequently for 2 h at 120° C.

The PVA membrane produced is removable from the polypropylene dish.

Testing the Porous Membranes from Inventive Example 3 and Comparative Example 4

The membrane from Inventive Example 3 or Comparative Example 4 was more particularly investigated in an ultrafiltration test stand with a dextran test solution according to the ASTM E-1343-90 test method.

The inventive membrane from Example 3 did separate the dextrans. The membrane was stable under these conditions.

The membrane from Comparative Example 4, by contrast, quickly dissolved in the aqueous test medium.

This illustrates the inadequate hydrolytic stability of non-inventive membranes comprising polyvinyl alcohol.

Stability Investigations:
To examine whether the different membranes withstand the conditions in the pervaporation cell, the membranes were stored at 80° C. in the test solution (70:30 ethanol:water) for 6 h.

Thereafter, the weight increase and the volume change of the membranes was determined. The test results of three membranes are summarized in Table 1.

TABLE 1

Results from stability investigations:

|  | Absorption in % by weight | Volume change in % by volume |
|---|---|---|
| Inventive Example 1 | +15 | +10 |
| Inventive Example 2 | +15 | +10 |
| Comparative Example 5 | >+200 | cannot be determined |

As is discernible from Table 1, the inventive membranes (Examples 1 and 2) have the desired stability, whereas the conventional membrane (Comparative Example 5) swells up very strongly in the test medium and loses its geometric shape and mechanical stability.

The inventive membranes, by contrast, exhibit outstanding dimensional stability and adequate swelling.

Investigations in Pervaporation Test Stand:

The membranes from Inventive Examples 1 and 2 and from Comparative Example 5 were installed in a pervaporation test cell to determine their separation performance. The test conditions were kept constant for all three membranes (test medium: 90:10 or 70:30, ethanol:water, temperature: 70° C., vacuum: permeate side: 100 mbar).

The results for the membranes are summarized in Table 2. Permeate is that proportion of the test medium which flows through the membrane. Retentate, by contrast, is that proportion of test medium that does not flow through the membrane.

TABLE 2

Results of pervaporation tests on membranes 4, 5 and 7:

| Membrane | Ethanol content of test medium (% by weight) | Water content of permeate (% by weight) | Ethanol content of retentate (% by weight) |
| --- | --- | --- | --- |
| Inventive Example 1 | 90 | 95 | 99 |
| Inventive Example 2 | 90 | 94 | 99 |
| Comparative Example 5 | 90 | 82 | 95 |
| Inventive Example 1 | 70 | 92 | 99 |
| Comparative Example 5 | 70 | no measurement possible | |

Table 2 reveals that the inventive membranes (Examples 1 and 2) effectuate a very high degree of purification compared with the conventional membrane (Comparative Example 5). Furthermore, the inventive membranes can be used to also separate mixtures that have high water contents. The conventional membrane (Comparative Example 5) swells up very substantially under these conditions and ruptures because of low mechanical strength. Furthermore, the flux rates achieved with the membrane from Comparative Example 5 were distinctly lower, since this membrane swells substantially and hence had built up a distinctly higher barrier to transfer than the inventive membranes.

The invention claimed is:

1. A membrane prepared from one or more silane-modified polyvinyl alcohols obtainable by the steps comprising
    a) free-radically initiated copolymerization of one or more vinyl esters of branched or unbranched carboxylic acids having 1 to 15 carbon atoms and one or more ethylenically unsaturated silane compounds selected from the group consisting of compounds of the general formulae $CR_2=CR-B-Si(OR')_{3-n}(R'')_n$     (1) or $CR_2=CRC(=O)-D-B-Si(OR')_{3-n}(R'')_n$     (2), where B represents an aryl, heteroaryl or $(CR_2)_m$ moiety in which optionally one or more nonadjacent $CR_2$ groups may be replaced by heteroatoms,
    D represents a heteroatom,
    R represents a hydrogen atom, an alkyl or aryl moiety or a heteroatom which optionally is substituted with a hydrogen atom or with an alkyl or aryl moiety,
    OR' represents an alkoxy, alkylcarboxy or arylcarboxy moiety,
    R" represents an alkyl or aryl moiety, and
    n is 0, 1 or 2 and
    m is from 0 to 15, and
    b) subsequent saponification of the silane-modified vinyl ester copolymers obtained in step a).

2. The membrane according to claim 1, wherein the ethylenically unsaturated silane compounds are selected from the group consisting of vinyltrimethoxysilane, vinyldimethoxymethylsilane, vinyldimethylmethoxysila ne, vinyltriethoxysilane, vinyldiethoxymethylsilane, vinyldimethylethoxysilane, vinyltriisopropoxysilane, vinyldiisopropoxymethylsilane, vinyldimethylisopropoxysilane, vinyltributoxysilane, vinyldibutoxymethylsilane, vinyldimethylbutoxysilane, vinyltriacetoxysilane, gamma-acryloyl- or gamma-methacryloyloxyisopropyl-trialkoxysilane, gamma-methacryloyloxymethyldi(alkoxy)methylsilane, gamma-methacryloyloxydimethyl(alkoxy)silane, alpha-methacryloyloxymethyltri(alkoxy)silane, alpha-methacryloyloxymethyldi(alkoxy)methylsilane and alpha-methacryloyloxydimethyl(alkoxy)silane.

3. The membrane according to claim 1, wherein step a) utilizes from 0.1 to 30 mol % of ethylenically unsaturated silane compounds, based on the total amount of monomers in step a).

4. A membrane according to claim 1, wherein the membrane is in the form of a flat sheet obtainable by applying one or more solutions of the one or more silane-modified polyvinyl alcohols to a substrate and also drying and crosslinking the one or more applied silane-modified polyvinyl alcohols.

5. The membrane according to claim 4, wherein 10 to 90% of the silicon atoms of the originally used silane-modified polyvinyl alcohols are in a crosslinked state, based on the total number of silicon atoms of the silane-modified polyvinyl alcohols used.

6. The membrane according to claim 4, wherein the membrane layer containing crosslinked silane-modified polyvinyl alcohols consists of the crosslinked silane-modified polyvinyl alcohols to an extent of at least 50% by weight, based on the total mass of the aforementioned layer.

7. A process for producing a flat sheet membrane according to claim 4 further comprising
    c) applying the one or more solutions of the one or more silane-modified polyvinyl alcohols to a substrate,
    d) optionally performing a phase inversion process, and
    e) then drying and crosslinking the silane-modified polyvinyl alcohols.

8. The process for producing a flat sheet membrane according to claim 7, wherein the substrates contain one or more substances selected from the group consisting of metals, metal oxides, polymers or glass.

9. The process for producing a flat sheet membrane according to claim 7, wherein the one or more solutions of the one or more silane-modified polyvinyl alcohols in step c) contain one or more organic solvents and/or one or more inorganic solvents.

10. The process for producing a flat sheet membrane according to claim 7, wherein the products of step c) are introduced into a coagulation medium in the course of the phase inversion process d).

11. The process for producing a flat sheet membrane according to claim 10, wherein the coagulation medium comprises one or more solvents selected from the group consisting of alcohols, ketones or nitrogen-containing solvents.

12. The process for producing a flat sheet membrane according to claim 7, wherein the drying and crosslinking in step e) is carried out at temperatures between 20 and 200° C.

13. A method of separating components in a mixture, comprising applying the membrane of claim 4 to the mixture such that at least one component of the mixture is retained and at least one component of the mixture permeates the membrane.

14. A membrane according to claim 1, wherein the membrane is in the form of a hollow fiber obtainable by spinning one or more solutions of the one or more silane-modified polyvinyl alcohols and also drying and crosslinking the silane-modified polyvinyl alcohols.

15. A process for producing the hollow fiber membrane according to claim 14 further comprising
   c) spinning the one or more solutions of the one or more silane-modified polyvinyl alcohols,
   d) optionally performing a phase inversion process, and
   e) then drying and crosslinking.

16. The process for producing a hollow fiber membrane according to claim 15, wherein the solutions of silane-modified polyvinyl alcohols in step c) contain one or more organic solvents and/or one or more inorganic solvents.

17. The process for producing a hollow fiber membrane according to claim 15, wherein the products of step c) are introduced into a coagulation medium in the course of the phase inversion process d).

18. The process for producing a hollow fiber membrane according to claim 17, wherein the coagulation medium comprises one or more solvents selected from the group consisting of alcohols, ketones or nitrogen-containing solvents.

19. The process for producing a hollow fiber membrane according to claim 15, wherein the drying and crosslinking in step e) is carried out at temperatures between 20 and 200° C.

20. The membrane according to claim 14, wherein 10 to 90% of the silicon atoms of the originally used silane-modified polyvinyl alcohols are in a crosslinked state, based on the total number of silicon atoms of the silane-modified polyvinyl alcohols used.

21. The membrane according to claim 14, wherein the membrane layer containing crosslinked silane-modified polyvinyl alcohols consists of the crosslinked silane-modified polyvinyl alcohols to an extent of at least 50% by weight, based on the total mass of the aforementioned layer.

22. A method of separating components in a mixture, comprising applying the membrane of claim 14 to the mixture such that at least one component of the mixture is retained and at least one component of the mixture permeates the membrane.

* * * * *